(12) United States Patent
't Hooft et al.

(10) Patent No.: US 7,143,313 B2
(45) Date of Patent: Nov. 28, 2006

(54) SUPPORT INTERFACE MODULE BUG SUBMITTER

(75) Inventors: Maarten W. 't Hooft, Foster City, CA (US); Ethan J. Rider, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 710 days.

(21) Appl. No.: 10/066,170

(22) Filed: Jan. 31, 2002

(65) Prior Publication Data

US 2004/0093405 A1 May 13, 2004

Related U.S. Application Data

(63) Continuation-in-part of application No. 10/007,633, filed on Nov. 9, 2001, now abandoned.

(51) Int. Cl.
*G06F 11/00* (2006.01)
(52) U.S. Cl. ...................................................... 714/38
(58) Field of Classification Search .................. 714/38
See application file for complete search history.

(56) References Cited

U.S. PATENT DOCUMENTS

| | | | |
|---|---|---|---|
| 5,022,028 A | 6/1991 | Edmonds et al. | 371/25.1 |
| 5,768,578 A | 6/1998 | Kirk et al. | 395/611 |
| 5,802,518 A | 9/1998 | Karaev et al. | 707/9 |
| 6,058,393 A * | 5/2000 | Meier et al. | 707/10 |
| 6,070,188 A | 5/2000 | Grant et al. | 709/223 |
| 6,119,247 A * | 9/2000 | House et al. | 714/38 |
| 6,178,504 B1 | 1/2001 | Fieres et al. | 713/164 |
| 6,202,070 B1 | 3/2001 | Nguyen et al. | 707/104 |
| 6,202,175 B1 * | 3/2001 | Mastrangelo et al. | 714/38 |
| 6,205,579 B1 | 3/2001 | Southgate | 717/11 |
| 6,263,456 B1 * | 7/2001 | Boxall et al. | 714/31 |
| 6,347,398 B1 | 2/2002 | Parthasarathy et al. | 717/11 |
| 6,349,137 B1 * | 2/2002 | Hunt et al. | 379/265.06 |
| 6,349,336 B1 | 2/2002 | Sit et al. | 709/227 |
| 6,360,334 B1 | 3/2002 | Kavanagh et al. | 714/38 |
| 6,389,467 B1 | 5/2002 | Eyal | 709/223 |
| 6,405,309 B1 | 6/2002 | Cheng et al. | 713/1 |
| 6,675,193 B1 | 1/2004 | Slavin et al. | 709/200 |
| 6,721,793 B1 | 4/2004 | Corless | 709/229 |
| 6,748,420 B1 | 6/2004 | Quatrano et al. | 709/205 |
| 6,836,805 B1 | 12/2004 | Cook | 709/245 |
| 6,859,893 B1 * | 2/2005 | Hines | 714/38 |
| 2003/0093536 A1 * | 5/2003 | 't Hooft | 709/227 |
| 2003/0110473 A1 * | 6/2003 | Kadlecik et al. | 717/128 |
| 2003/0120979 A1 * | 6/2003 | Lee et al. | 714/38 |

FOREIGN PATENT DOCUMENTS

| | | |
|---|---|---|
| EP | 0 778 520 | 6/1997 |
| WO | WO 98/43212 | 10/1998 |
| WO | WO 98/52158 | 11/1998 |

* cited by examiner

*Primary Examiner*—Michael Maskulinski
(74) *Attorney, Agent, or Firm*—Gunnison, McKay & Hodgson, L.L.P.; Forrest Gunnison

(57) ABSTRACT

A method for submitting a bug report utilizes a bug submission module to request a bug submission service from a first support host using a Support Interface Module for communicating with the first support host. The bug submission service includes a list of data to be collected and the return address of a second support host. The first support host also includes a support services resource. The bug submission module receives the requested bug submission service from the first support host using the Support Interface Module and collects data based on the list of data to be collected. The bug submission module then sends the collected data to the return address of second support host using the Support Interface Module.

15 Claims, 3 Drawing Sheets

SUPPORT INTERFACE MODULE BUG SUBMITTER

CROSS-REFERENCES

This is a continuation-in-part of U.S. patent application Ser. No. 10/007,633 filed Nov. 9, 2001 now abandoned, in the name of inventor Maarten W. 't Hooft, entitled "Support Interface Module", commonly assigned herewith.

FIELD OF THE INVENTION

The present invention relates generally to the field of computer science. More specifically, the present invention relates to a support interface module bug submitter over which channels of information can flow between an application interface and an external support service.

BACKGROUND OF THE INVENTION

Despite the advancement of technology, users continue to experience problems with computer systems. Support may then be needed. Support may include a number of services including an explanation of features or the trouble shooting of problems. Traditional support takes many forms. For instance, support may take the form of a user manual. Many users find these little help at all if they can even locate the manual when they need one. To combat this, support may take the form of an embedded help function. This may be query or menu driven. Again this is a form of self-help and it is limited to the time when the function is fixed in the application. To reduce time dependency and memory demands, support may take the form of a dedicated help server external to the application. Increasingly, applications and users are connected together by networks such as the Internet. In this case, the user leaves the application and, via the network, contacts the help server independently and seeks the support that they need there. If this does not prove adequate, the user may phone a dedicated help provider and speak with one of their representatives or listen to their automated service. Individually or in combination, traditional forms of support may often prove unsatisfactory to the user.

A bug is a persistent error in a software or hardware. One way to get rid of the bug it to modify the program, usually with a software patch for software. A bug report consisting of data describing the error that occurred, may be submitted to a support provider or the software developer. The support provider once notified of the bug, may then prepare a software patch or a new version of the software removing the bugs previously found.

A definite need exists for a bug submission module allowing the user to select how and where a bug report is submitted. A primary purpose of the present invention is to solve these needs and provide further related advantages.

BRIEF DESCRIPTION OF THE INVENTION

A method for submitting a bug report utilizes a bug submission module to request a bug submission service from a first support host using a Support Interface Module for communicating with the first support host. The bug submission service includes a list of data to be collected and the return address of a second support host. The first support host also includes a support services resource. The bug submission module receives the requested bug submission service from the first support host using the Support Interface Module and collects data based on the list of data to be collected. The bug submission module then sends the collected data to the return address of second support host using the Support Interface Module.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Embodiments of the present invention are described herein in the context of a support interface module bug submitter. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
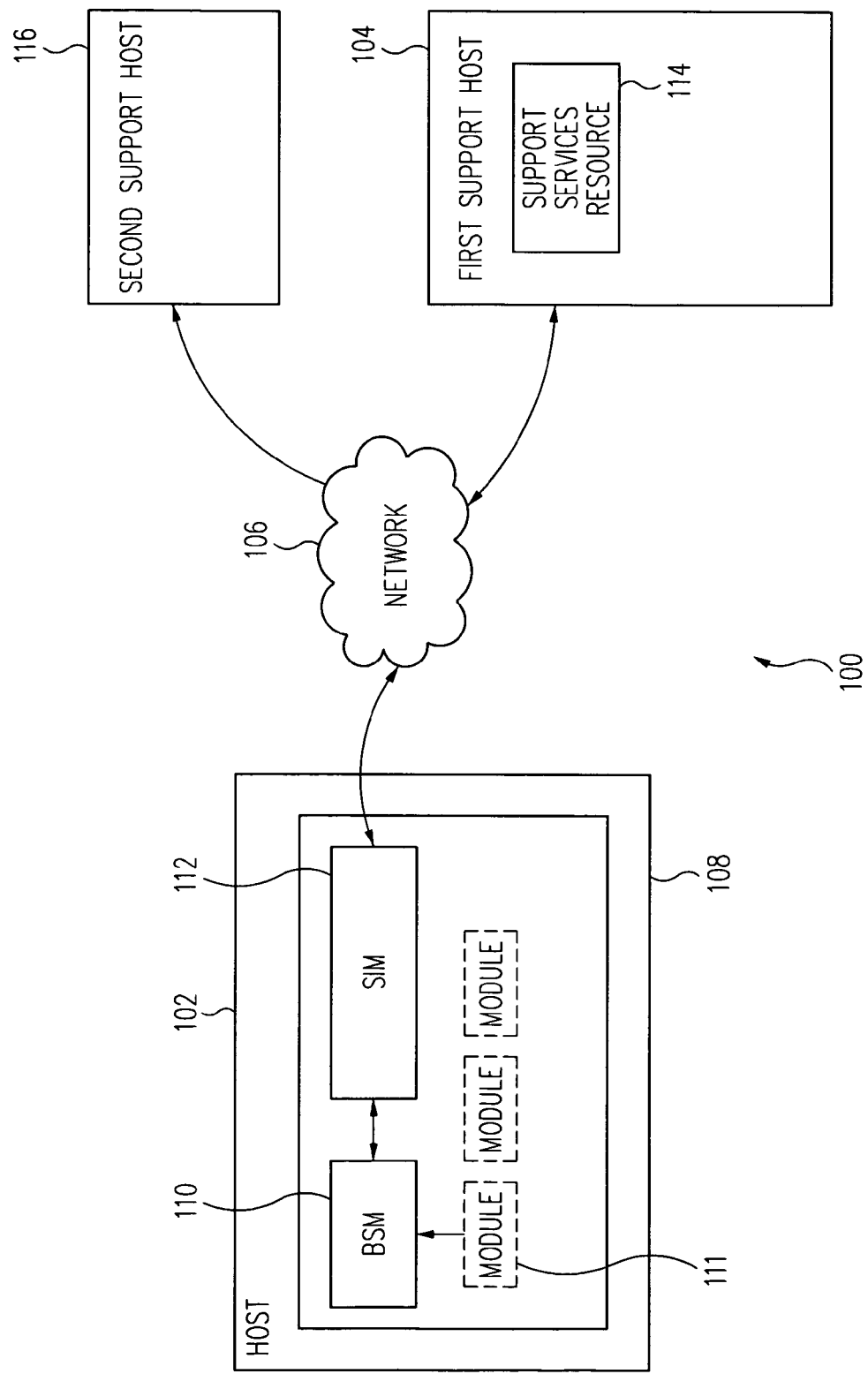
FIG. 1 is a block diagram that illustrates a Support Interface Module bug submission system according to a specific embodiment of the present invention.

Turning first to FIG. 1, a block diagram of a bug submission system 100 is shown. The system 100 includes a host system 102, a first support host 104, and a network 106 connecting the host system 102 to the first support host 104.

One of ordinary skill in the art will recognize that the network 106 may take one of many forms. For the sake of clarity, these will not be presented here. The host system 102 includes at least one application having an interface 108 for the user. The application may also take many forms including word processor or network browser. Likewise, the outward manifestation of the interface 108 may take many forms but will typically be a graphical user interface. The interface 108 includes a bug submission module 110 that enables the user of the application to submit a bug report for a particular module 111 having a bug. The bug submission module 110 is described in more detail below. In addition, the bug submission module 110 communicates with and through a support interface module (SIM) 112. The SIM 112 may be integral to the application, to the host system 102, or to some combination of both. In some contexts, the SIM 112 may not be referred to as a module but will still perform the same functions. The SIM 112 provides the infrastructure over which channels of information can flow between the host system 102 and the first support host 104. The first support host 104 includes a support services resource 114 that is called upon to help submit the bug. In one specific embodiment, the support services resource 114 includes a bug submission service having a list of data to be collected on the host system 102 and the return address of the support host that the list of collected data will be sent to when that service is selected. The collected data can either be sent to the first support host 104 or to a third party support host, such as second support host 116. The destination of the collected data depends on the user's choice of service. The user should only view the result of the collaboration between the bug submission module 110 and the SIM 112. The result is a bug submission presence within the application itself.

In order for the SIM 112 to configure and manage the communication of data from the bug submission module 110 to the first support host 104, the SIM 112 may need information such as the address of the support services resource 114, the type of communication protocol to be used, the port to contact and the eligibility of use of the support services resource 114. The SIM 112 can obtain the necessary information in at least one of three different ways. Two of these methods rely on the use of description facilities while the third requires no description searching.

According to one embodiment, the SIM 112 can contact a support services registry for information on a service. The location of the support services registry can be predetermined or an address for the registry can be provided by an outside source. Among other information, the registry will contain information on whether a service exists, where it is located, and who may use it.

According to another embodiment, the SIM 112 may contact a service description servlet at the instruction of the bug submission module 110. The SIM 112 looks in a location specified by the bug submission module 110 for information regarding a particular service. The service description servlet will then pass on the information in a format similar to the one found on the support services registry.

According to a yet another embodiment, the SIM 112 may, on occasion, find that the bug submission module 110 itself contains all of the information needed. If so, the SIM 112 utilizes the information provided by the bug submission module 110 without reference to a registry or description service.

There are a number of general attributes that one might want the SIM 112 to exhibit. If one or more of these attributes are contrary to one another or to the specific environment, then they can be deleted or modified. One would prefer that the architecture of the SIM 112 be able to provide seamless communication between the user and the support services resource 114. Further, one would prefer that the SIM 112 be aware of the networking environment in which it resides. This awareness might include knowing which ports are accessible, what the various latencies are, what bandwidth is available, and what the current traffic load is. Further still, one would prefer that the SIM 112 be able to ensure the security and integrity of all of its communications with the first support host 104. Either continuously or on demand, one would prefer that the user be able to monitor the activity of the SIM 112. One would also prefer that the SIM 112 be able to correct for failed communication links or at least be able to present the user with options in such an event. The SIM 112 may communicate with one or more of any number of communications protocols in either or both a synchronous and an asynchronous mode.

Figure 2:
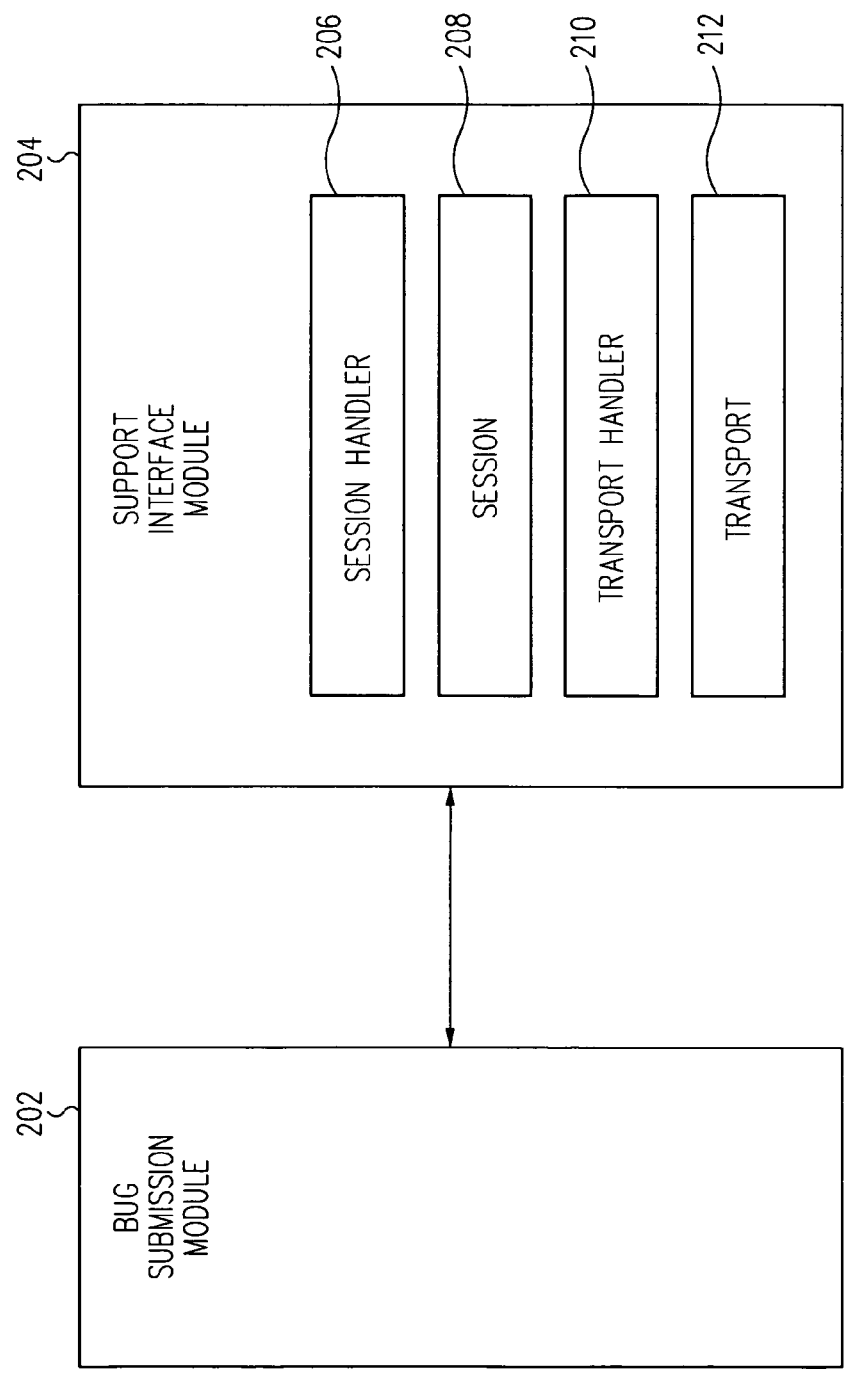
FIG. 2 is a block diagram that illustrates a bug submission module and the Support Interface Module of FIG. 1 according to a specific embodiment of the present invention.

Turning now to FIG. 2, a block diagram of the bug submission module 202 and the Support Interface Module 204 of FIG. 1 is shown. The SIM 204 is shown to include a session handler 206, at least one session 208, a transport handler 210, and at least one transport 212 for each session 208. Each component plays a role in the process of communication between the bug submission module 202 and the support services resource 114 of FIG. 1. Each component may be independent of one another or the SIM 202. Conversely, the function of each component may be combined in whole or in part without departing from the inventive concept disclosed herein. The session handler 206 provides coordination of the one or more sessions 208 that are ongoing. The transport handler 210 provides coordination of the one or more transports 212 per ongoing session 208.

One example of a communication process by the bug submission module 202 assumes that a user makes a request, then the bug submission module 202 initially processes this request. It may be the case that the bug submission module 202 can handle the request alone. When the bug submission module 202 can not handle all or some portion of the request alone, then it contacts the SIM 204. The SIM 204 passes the request to the session handler 206 which approves the request and generates at least one session 208 for the request. The session 208 in turn initializes the transport handler 210 for the communication required to deal with the request. The transport handler 210 generates at least one suitable transport 212 for the session 208. The transport 212 sends data to and/or receive data from the support services resource 114 of FIG. 1. It may be the case that the transport handler 210 is instructed to redirect the communication. In such a case, the transport handler 210 may generate a new transport 212 and terminate the original transport 212. Through its API, the session 208 cooperates with the bug submission module 202 to satisfy the user's request. Consequently, after the initial request, all subsequent communication by the bug submission module 202 for the request is with the session 208 and not with the session handler 206. When the request of the user is either satisfied or withdrawn, some or all of the sessions 208 and the transports 212 that were generated for that request may be terminated. Multiple requests may be processed in sequence or in parallel.

As above with the SIM 204 in general, there are a number of general attributes that one might want the components of the SIM 204 to exhibit. If one or more of these attributes are contrary to one another or to the specific environment, then they can be deleted or modified. For example, one would expect that the session handler 206 would be aware of all of the sessions 208 that are generated. Further, one would prefer that the session handler 206 hold data about the host system 102 and the network 106 of FIG. 1. Also, one would prefer that the session handler 206 be aware of the network activity originating from the host system 202. In addition, one would prefer that the session handler 206 use this network activity awareness to scale its own network activity to avoid significant performance loss to the host system 102. It would also be preferred that the session handler 206 to be able to provide information regarding or correction of communication failures. Further still, one would prefer that the session handler 206 be able to provide status info for each session 208 either continuously or on demand.

It may be the case that a host system 102 includes multiple SIMs 204. In such a case, it may be necessary to coordinate the individual SIMs 204. This may be accomplished in a number of ways known to one of ordinary skill including disabling all but one of the session handlers 206 and placing the non-disabled session handler 206 in control of all of the SIMs 204. Another technique would be for the multiple session handlers 206 to hold an election to determine which session handler 206 will control the multiple SIMs 204.

With respect to the sessions 208, although there may be multiple sessions 208 running in series or in parallel, the individual sessions 208 may not be aware of one another. Further, one would prefer that the sessions 208 have a finite length and that either or both the session handler 206 and the bug submission module 202 be able to terminate the session 208. One would prefer for the session 208 to control communications between the SIM 204 and the bug submission module 202.

With respect to the transport handler 210, one would expect that the transport handler 210 would be aware of all of the transports 212 that it has generated. If there are multiple SIMs 204, a first transport handler 210 may or may not be aware of a second transport handler 210 or the transports 212 that the second transport handler 210 has generated. Further, one would expect the transport handler 210 to be able to communicate using one or more of any number of protocols. One would prefer that the transport handler 210 be able to generate diagnostic information on the network environment and characteristics and be able to pass this information on to the session handler 206. One would also prefer that the transport handler 210 be able to report errors and exceptions to the session handler 206.

With respect to the transports 212, although there may be multiple transports 212 in series or in parallel, the individual transports 212 may not be aware of one another. It may be the case that the transport 212 is channel dependent such that when the channel fails the transport 212 ends and a new transport 212 may have to be generated by the transport handler 210 to complete the failed communication.

According to one embodiment of the present invention, the Bug Submission Module 202 provides the user with several options. For instance, prior to submitting the bug, the user is presented with an opportunity to troubleshoot the problem (which will also automate the problem description), and review and approve any data collected. If the user chooses to submit the problem, an acknowledgement of the submission is provided. Once the context of the bug (the relevant module) is known, the Bug Submission module 202 presents the SIM services available for that module. Thus the SIM 204 may be used to invoke other arbitrary SIM services in the process of submitting a bug. This allows for more features to be embedded dynamically into the Bug Submitter module 202.

The Bug Submitter Module 202 submits its bug report through the SIM 112 and network 106. One of ordinary skill in the art will realize that there are many ways in which the SIM 112 may communicate with network 106. For example, SIM 112 may submit the bug reports via SOAP (over HTTP and SMTP). Additionally, the bug submission module 202 may provide an API for module developers to use their own transport mechanisms. According to one embodiment, the bug submission module 202 may not use SOAP but may simply open a Socket connection to transport the data to a support host. This would allow the use of third party toolkit vendors for an easy and extensible mechanism for transporting data. Since SOAP messaging is not bi-directional, the Bug Submission module 202 may rely on the SIM architecture to provide message acknowledgements where possible.

According to one embodiment, the bug submission module 202 comprises a receiver (not shown) for receiving a submission service using the SIM 112 to communicate with the first support host 104. The submission service comprises a list of data to be collected and the return address of a second support host. A collector (not shown) collects the data based on the list of data to be collected. A sender (not shown) sends the collected data to the second support host 116 using the SIM 112.

The bug submission module 202 may also incorporate a data collection service and a data delivery mechanism. The data collection service provides mechanisms for gathering information commonly requested by support engineers, as well as a mechanism for module developer to add data requirements for their reports. The data delivery mechanism may utilize a portion of a Support Services Interface Module API to transfer the collected data to a destination in the appropriate format.

According to one embodiment, with respect to the data collection service of the bug submission module 202, each report template should have specific information to collect. All automated data collectors may include a collection timeout. A call to retrieve collected data should either return the data when the collection is completed or set the data state to a failed status. The API for data collection should allow for module developers to provide custom report templates and data collection that follows the previously listed preferences. The collected data may include, by way of example, requests for user supplied data such as steps to reproduce, or support contract information. Such user supplied data should distinguish empty input from a failure to acquire input. All data collected should be associated with a data presenter appropriate for the user environment.

According to one embodiment, with respect to the data submission mechanism of the bug submission module 202, the data may be submitted only to the destination accepted by the user. Such destination should have at least one transport. However in case of failure, more than one transport may be used. The transport may specify a protocol and address for the transmission of the data. The destination may provide information to prove its identity to the user. The destination may attempt to use alternate transports prior to failing completely. The destination may also attempt to confirm transmission. In the event of a complete transmission failure, the bug submission module 202 should allow for retransmission or the specification of a new destination.

Figure 3:
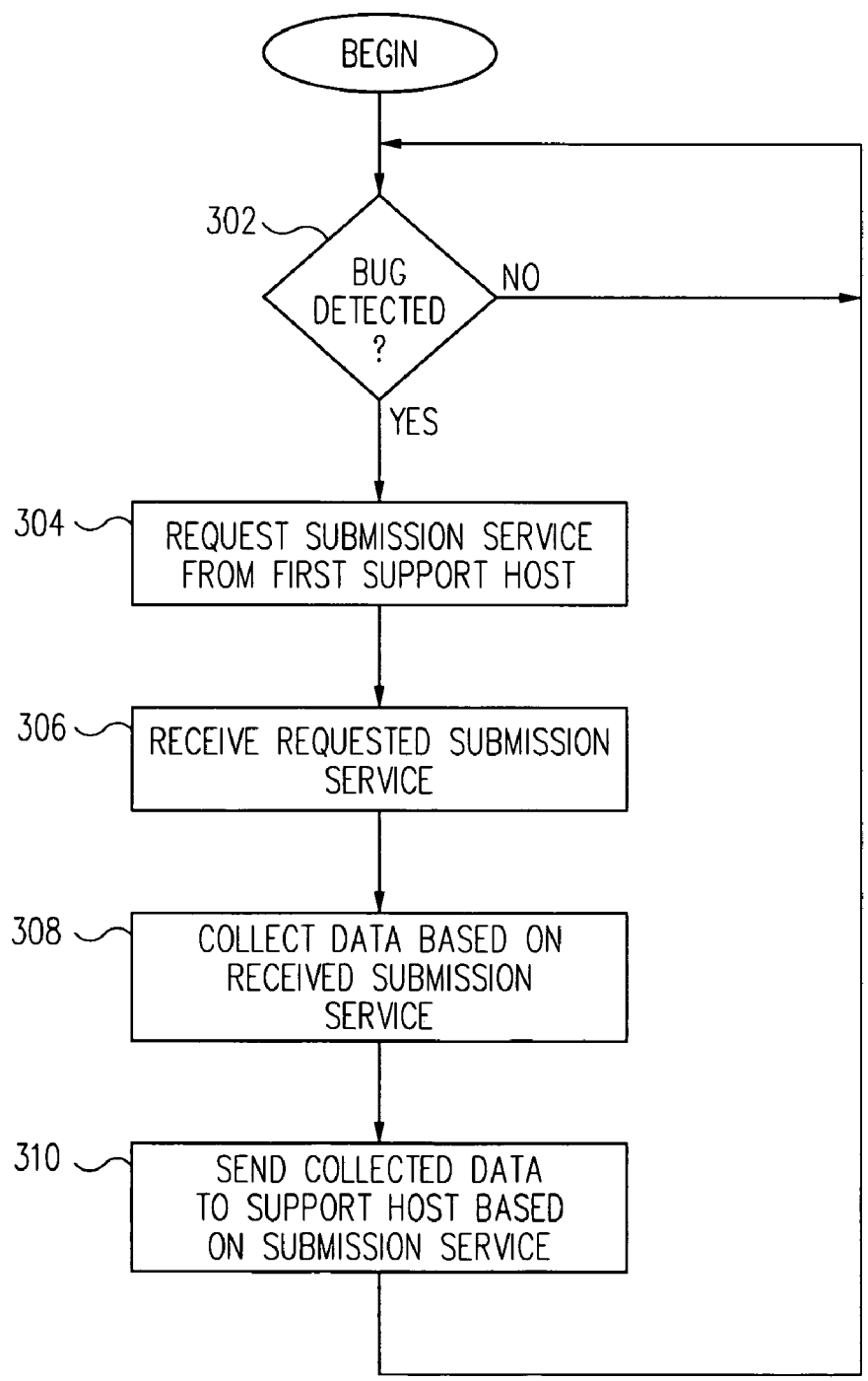
FIG. 3 is a flow diagram that illustrates a method for a bug submission according to a specific embodiment of the present invention.

Turning now to FIG. 3, a flow diagram of a method for submitting a bug report according to the bug submission module 202 is shown. In a first decision block 302, a bug is detected on the host system 102 of FIG. 1. When a bug is detected, the bug submission module 110 of FIG. 1 receives a notification about the presence of the bug. The Bug Submission module 110 then requests a Bug Submission service from a first support host 104 in block 304. In response to the request, the requested Bug Submission service 110 is received in block 306. The Submission Service comprises a list of data to be collected and the return address of a support host. In block 308, the bug submission module 110 collects data based on the list of data to be collected as specified in the requested submission service. The bug submission module 110 submits the collected data via SIM 112 to the support host as specified in the submission service in block 310. The support host may either be the first support host 104 or another support host such as second support host 116.

According to another embodiment, the SIM may provide for a Collector class (not shown) to developers. Collectors are intended to obtain data from the user or the environment. Those collectors that retrieve information from the environment (the user's system) will be required to be able to run more than once, such that if a user accidentally overwrites the collected data, it can be retrieved once again. If it is not possible for the value to change between runs, it is acceptable for the Collector to simply cache and return the last value obtained.

According to another embodiment of the present invention, after all data collection has been done, each piece of data will be presented to the user. Each piece of data will be associated with a Presenter, either because the data has a known MIME type associated with a presenter, or because the collector has associated this piece of data with a specific Presenter instance. It is a design goal to keep this API generic enough to be used from the command line.

One feature of the SIM bug submission module is the ability for third parties (Support Providers) to leverage the features for their customer base and support staff. Developer support may also include example codes and extensive base classes where applicable.

According to another embodiment, all bug reports (regardless of the report structure) must be compatible with a to-disk Transport provided by the SIM bug submission module. Basically this means that the bug report must be able to be saved to a file. The files should be designed so that they can be sent using a different user and machine than that which generated the report.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for submitting a bug report, the method comprising:
    requesting, using a Support Interface Module, a bug submission service from a first support host, said bug submission service having (i) a list of data to be collected on a host where a bug occurred and (ii) a support host return address, said first support host having a support services resource wherein said Support Interface Module is on said host where said bug occurred; and said Support Interface Module is for communicating with said first support host;
    receiving, on said host, said requested bug submission service, from said first support host, including (i) said list of data to be collected on said host where said bug occurred and (ii) said support host return address;
    collecting data, on said host, based on said list of data to be collected; and
    sending said collected data from said host to said support host return address using said Support Interface Module on said host wherein said support host return address is one of a first support host return address of said first support host and a third party support host return address of a third party support host.

2. The method according to claim 1 wherein said support services resource further comprises a directory of support host addresses.

3. The method according to claim 1 wherein said requesting, said receiving and said sending further comprises:
    receiving said bug submission service request by the support interface module;
    establishing overall control of said bug submission service request process; generating at least one session for said bug submission service request;
    initializing communication control of said bug submission service request process; generating at least one transport for the at least one session; and transmitting and/or receiving data via the at least one transport.

4. A bug submission module comprising:
    a receiver, on a host, for receiving, from a first support host, a bug submission service having (i) a list of data to be collected on said host after a bug occurred and (ii) a support host return address, said first support host having a support services resource wherein said receiver uses a Support Interface Module for said receiving; said Support Interface Module is on said host where said bug occurred; and said Support Interface Module is for communicating with said first support host;
    a collector, on said host, coupled to said receiver for collecting data, from said host, based on said list of data to be collected; and
    a sender, on said host, coupled to said collector for sending said collected data to said support host return address using said Support Interface Module wherein said support host return address is one of a first support host return address of said first support host and a third party support host return address of a third party support host.

5. The bug submission module according to claim 4 wherein said support services resource further comprises a directory of support host addresses.

6. The bug submission module according to claim 4 wherein said Support Interface Module further comprises:
    a session handler for receiving a user request from a bug submission module and for controlling the activities of said Support Interface Module;
    at least one session generated by the session handler for processing said user request;
    a transport handler initialized by said at least one session for managing communications with said first support host; and
    at least one transport generated by said transport handler for communication of said at least one session with said support services resource.

7. A host system comprising:
    a Support Interface Module for communications between the host system and a first support host having a support services resource; and
    an application having a bug submission module, said bug submission module including:
        a receiver for receiving, from said first support host after a bug occurred on said host system, a bug submission service having (i) a list of data to be collected on said host system after said bug occurred and (ii) a support host return address wherein said receiver uses said Support Interface Module for said receiving;

a collector coupled to said receiver for collecting data, on said host system, based on said list of data to be collected; and a sender coupled to said collector for sending said collected data to said support host return address using said Support Interface Module wherein said support host return address is one of a first support host return address of said first support host and a third party support host return address of a third party support host.

8. The bug submission module according to claim 7 wherein said support services resource further comprises a directory of support host addresses.

9. The bug submission module according to claim 7 wherein said Support Interface Module further comprises:

a session handler for receiving a user request from a bug submission module and for controlling the activities of said Support Interface Module;

at least one session generated by the session handler for processing said user request;

a transport handler initialized by said at least one session for managing communications with said first support host; and at least one transport generated by said transport handler for communication of said at least one session with said support services resource.

10. A bug submission module comprising:

means for requesting, using a Support Interface Module, a bug submission service from a first support host, said bug submission service having (i) a list of data to be collected on a host where a bug occurred, and (ii) a support host return address, said first support host having a support services resource wherein said Support Interface Module is on said host where said bug occurred; and said Support Interface Module is for communicating with said first support host;

means for receiving, on said host, said requested bug submission service, from said first support host, including (i) said list of data to be collected on said host where said bug occurred and (ii) said support host return address;

means for collecting data, on said host, based on said list of data to be collected; and means for sending said collected data from said host to said support host return address using said Support Interface Module on said host wherein said means for sending said collected data from said host to said support host return address using said Support Interface Module on said host further comprises:

means for sending said collected data to at least one of a first support host return address of said first support host and a third party support host return address of a third party support host.

11. The bug submission module according to claim 10 wherein said support services resource further comprises a directory of support host addresses.

12. The bug submission module according to claim 10 wherein said means for requesting, said means for receiving, and said means for sending further comprise:

means for receiving said bug submission service request by the support interface module; means for establishing overall control of said bug submission service request process; means for generating at least one session for said bug submission service request; means for initializing communication control of said bug submission service request process;

means for generating at least one transport for the at least one session; and means for transmitting and/or receiving data via the at least one transport.

13. A computer-readable medium having embodied therein computer program instructions for a method for submitting a bug report to a support host, the method comprising:

requesting, using a Support Interface Module, a bug submission service from a first support host, said bug submission service having (i) a list of data to be collected on a host where a bug occurred and (ii) a support host return address, said first support host having a support services resource wherein said Support Interface Module is on said host where said bug occurred; and said Support Interface Module is for communicating with said first support host;

receiving, on said host, said requested bug submission service, from said first support host, including (i) said list of data to be collected on said host where said bug occurred and (ii) said support host return address;

collecting data, on said host, based on said list of data to be collected; and sending said collected data from said host to said support host return address using said Support Interface Module on said host wherein said support host return address is one of a first support host return address of said first support host and a third party support host return address of a third party support host.

14. The computer-readable medium according to claim 13 wherein said support services resource further comprises a directory of support host addresses.

15. The computer readable medium according to claim 13 wherein said requesting, said receiving and said sending further comprises:

receiving said bug submission service request by the support interface module; establishing overall control of said bug submission service request process; generating at least one session for said bug submission service request;

initializing communication control of said bug submission service request process; generating at least one transport for the at least one session; and transmitting and/or receiving data via the at least one transport.

* * * * *